No. 847,487. PATENTED MAR. 19, 1907.
J. D. MAXWELL.
ANNULAR BALL BEARING.
APPLICATION FILED JAN. 9, 1906.
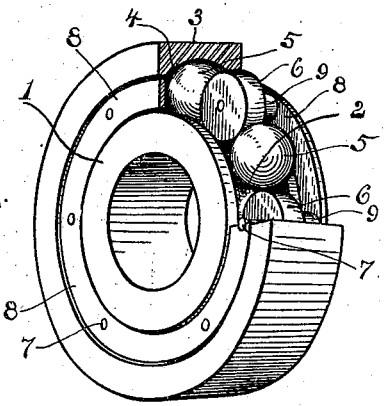
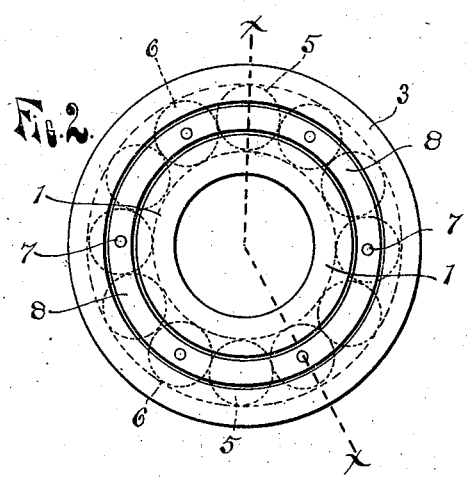
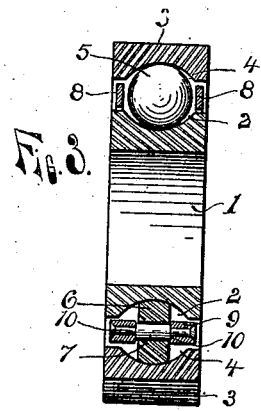
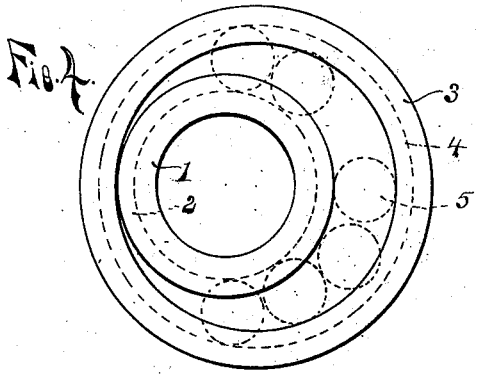
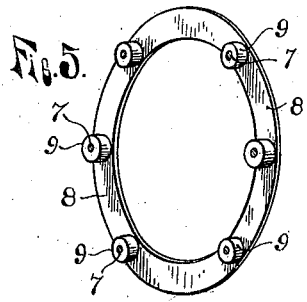
WITNESSES:
L. E. Flanders
Oliver E. Barthel
INVENTOR.
Jonathan D. Maxwell
BY
ATTORNEYS.

UNITED STATES PATENT OFFICE.

JONATHAN D. MAXWELL, OF TARRYTOWN, NEW YORK.

ANNULAR BALL-BEARING.

No. 847,487.    Specification of Letters Patent.    Patented March 19, 1907.

Application filed January 9, 1906. Serial No. 295,222.

*To all whom it may concern:*

Be it known that I, JONATHAN D. MAXWELL, a citizen of the United States of America, residing at Tarrytown, in the county of Westchester and State of New York, have invented certain new and useful Improvements in Annular Ball-Bearings, of which the following is a specification, reference being had therein to the accompanying drawings.

This invention relates to improvements in ball-bearings, and more especially to ring or annular bearings in which an inner bearing-sleeve and an outer bearing-ring each provided with an uninterrupted ball-race are employed, said ring and sleeve so proportioned relative to the size of the balls that when the sleeve is held concentrically within the ring the balls will be held in place by their engagement with the groove, but may be removed therefrom or inserted therein by moving the sleeve into an eccentric position within the ring; and the object of the invention is to provide such a bearing with rolls so constructed that they may be inserted through the space between the sleeve and ring into the race between the balls to space said balls apart and form contact-rolls.

A further object of the invention is to provide means for journaling the rolls and holding the same at equal distances apart and to provide certain other new and useful features, all as hereinafter more fully described, reference being had to the accompanying drawing, in which—

Figure 1 is a perspective view of a bearing embodying the invention, with parts broken away to show the construction. Fig. 2 is a side elevation of the same; Fig. 3, a section on the line $x$ $x$ of Fig. 2. Fig. 4 is a side elevation of the sleeve and ring, illustrating the manner of inserting the balls in the bearing; and Fig. 5 is a perspective view of one of the spacing-rings detached.

As shown in the drawings, 1 is a sleeve-bearing adapted to be slipped upon a shaft or other support in the ordinary manner and provided with a ball race or groove 2 in its peripheral face. 3 is a ring-bearing provided with a similar ball race or groove 4 in its internal face, and 5 is a series of balls of such a size that when spaced evenly they will all contact both races and will hold the sleeve concentric with the ring. The diameter of the sleeve, however, is enough smaller than the internal diameter of the ring to permit the balls to be inserted into the race through the space between the sleeve and ring at one side thereof when said sleeve is moved to an eccentric position within the ring, as shown in Fig. 4. Only about one-half enough balls may thus be inserted to fill the race, and to space the balls evenly and fill the race rolls 6 are inserted between the balls. These rolls are in the form of mutilated balls, the same being flattened at two sides sufficiently to permit them to be inserted edgewise between the sleeve and ring when said ring is held concentric with the sleeve by the balls. The rolls when so inserted in the race are then turned therein to bring their flattened sides outward and in a position to roll longitudinally within the race, and as said rolls are of substantially the same diameter as the balls they, together with said balls, fill the race and form a rolling contact for the ring.

When the rolls are turned as described, they are held in that position to roll within the race by journaling them upon pins 7, extending through axial openings in the rolls, and these pins are secured to spacing-rings 8, formed with inwardly-projecting studs 9, having holes to receive the reduced ends of the pins. Shoulders 10 are formed on the pins by the reduced ends to engage the inner ends of the studs 9, and the outer ends of the pins are riveted down to hold them firmly in the rings. The rolls are thus accurately spaced and guided by the rings to turn freely, and said rings lie within the space between the sleeve and ring at each side of the balls, so that they do not project beyond the end faces of the bearing. When said pins are riveted to the rings, the parts are all firmly held in place, making a very efficient and compact bearing from which it is impossible for a ball to escape or get out of place and in which the ball-race is smooth and continuous throughout.

Having thus fully described my invention, what I claim is—

1. In a bearing, the combination of a ring and a sleeve each integrally formed from a single piece and having opposing grooves in their adjacent faces, said grooves being uninterrupted throughout their circumference and said sleeve and ring being adapted to admit balls to the grooved space between them by their displacement eccentrically to each other, balls in said grooves, and spacing-rolls between the balls having a diameter equal to that of the balls and adapted to be inserted sidewise into the grooves through the space between the ring and sleeve, pins on which the rolls are journaled and spacing-rings to which the opposite ends of the pins are secured.

2. In a bearing, the combination of a bearing-sleeve and a ring having uninterrupted opposing grooves in their adjacent faces, the sides of which grooves are adapted to engage balls to substantially prevent lateral movement and the sleeve and ring being adapted to admit balls to the grooved space between them by their displacement eccentrically to each other, balls within said grooves, mutilated balls the sides of which are flattened to permit their insertion between the sleeve and ring and forming spacing-rolls between the balls, and means upon which said rolls are journaled to hold the same in position within the grooves.

3. In a bearing, the combination of a bearing-sleeve and a ring each integrally formed from a single piece of metal and having uninterrupted opposing grooves in their adjacent faces and being adapted to admit balls to the grooved space between by their displacement eccentrically to each other, balls within said grooved space between the ring and sleeve, a series of rolls of a diameter equal to that of the balls interposed between the balls, the length of each of which rolls is less than the space between the sleeve and ring, and spacing-rings upon opposite sides upon which the rolls are journaled.

4. In a bearing, the combination of a bearing-sleeve and a ring having uninterrupted opposing grooves in their adjacent faces and being adapted to admit balls to the grooved spaces between by their displacement eccentrically to each other, balls within said grooved space between the ring and sleeve, a series of mutilated balls forming rolls, one dimension of each which is less than the space between the sleeve and ring, interposed between the balls to space the same apart, pins extending through said rolls, and spacing-rings at each side of the balls to which the pins are secured to journal the rolls and space the same apart.

5. In a bearing, the combination of a bearing-sleeve and a ring having uninterrupted opposing grooves in their adjacent faces and being adapted to admit balls to the grooved space between by their displacement eccentrically to each other, balls within said grooved space between the ring and sleeve, a series of mutilated balls of substantially the same diameter as the balls and having flattened sides to permit their insertion into the grooves through the space between the sleeve and ring and provided with axial openings to form spacing-rolls between the balls, a spacing-ring at each side of the balls within the space between the sleeve and ring, studs on said rings extending inward toward the flattened sides of the rolls and formed with axial holes, and pins extending through the rolls and provided with reduced ends forming shoulders engaging the studs and secured within the holes in the studs.

In testimony whereof I affix my signature in presence of two witnesses.

JONATHAN D. MAXWELL.

Witnesses:
   J. T. CONNELL,
   JAS. P. ROOME.